Patented July 26, 1932

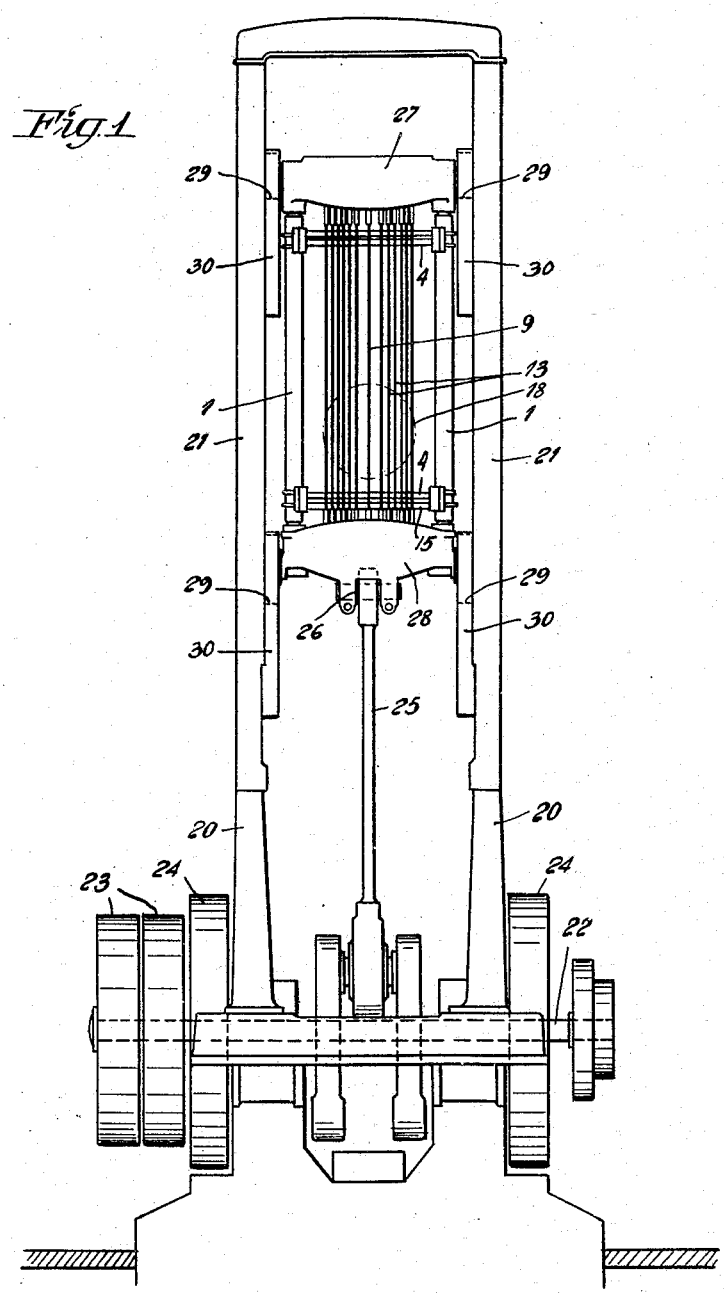

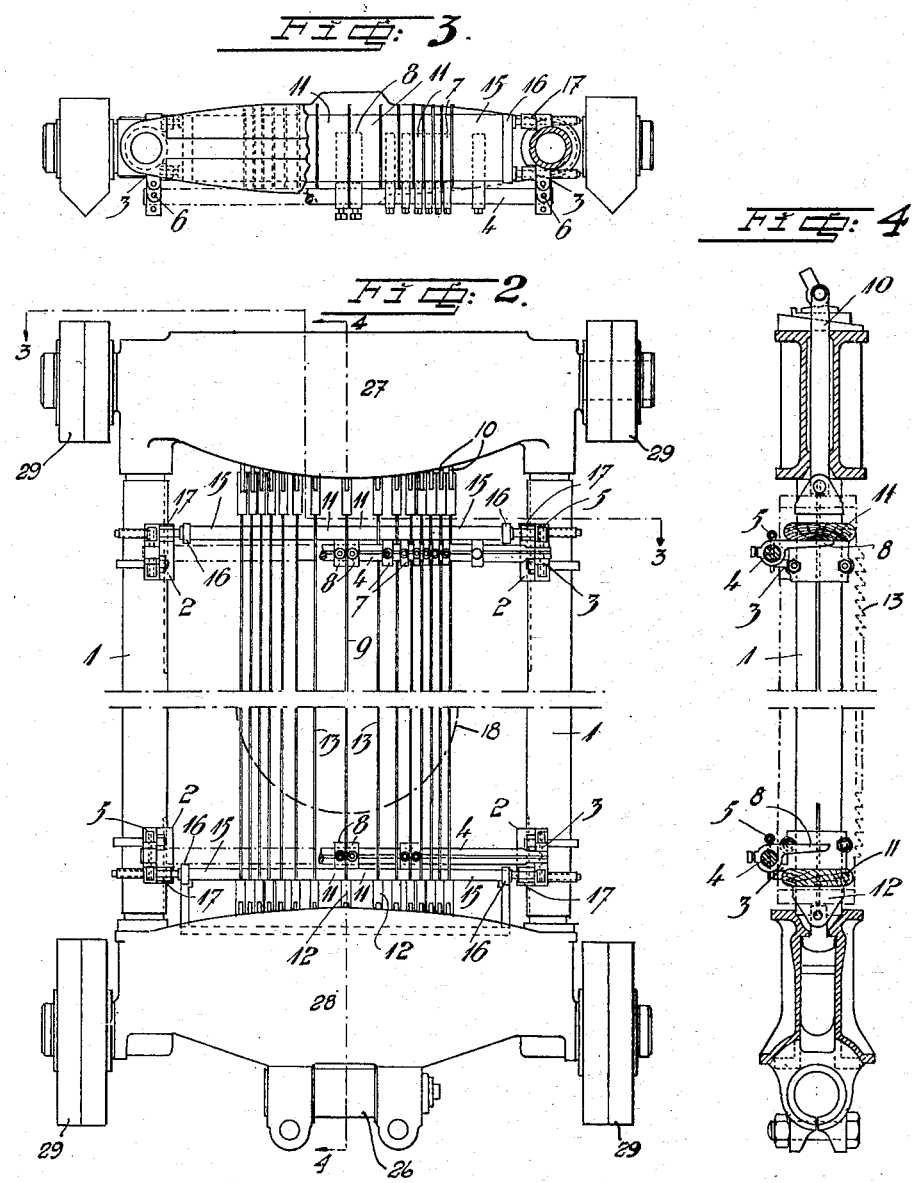

1,868,845

UNITED STATES PATENT OFFICE

KARL ERIK RUDOLF ÖSTERBERG, OF STOCKHOLM, SWEDEN, ASSIGNOR TO J. & C. G. BOLINDERS MEKANISKA VERKSTADS AKTIEBOLAG, OF STOCKHOLM, SWEDEN, A JOINT-STOCK COMPANY OF SWEDEN

DEVICE FOR INSERTING SAW BLADES INTO SAW FRAMES

Application filed July 14, 1931, Serial No. 550,737, and in Germany July 16, 1930.

Hitherto, the insertion of saw blades into the saw frames provided therefor has been a tedious and difficult task, particularly so where the whole set of blades comprises a great number of blades. This is so for the reason that all blades have to be accurately adjusted, first, with respect to the plumb-line so as not to incline laterally, second, with respect to the direction of feed, and, third, in such manner that the blades are caused to tilt forwardly with their upper ends in a certain relation to the rate of feed during the sawing operation. Moreover, the blades must be placed at definite distances from each other in accurate agreement with the dimensions to be sawn. This distance is determined by intermediate members or gauges which are inserted and held fast between the blades. When the set of blades comprises a great number of blades, the retention of the gauges between the blades, until the adjustment of the whole set of blades has been finished and the whole set may be clamped together by the gauge tensioners, frequently involves difficulties. Before clamping together may be effected, the loosely inserted gauges are apt to fall down, which causes trouble through the repeated insertion thereof. A further important circumstance is that the auxiliary means used for the insertion of the blades must permit of being readily removed after the insertion has been completed, so that no unnecessary heavy parts need be entrained with the movable masses in the sawing operation.

It has been suggested to obviate some of the above mentioned drawbacks by arranging directing rods extending between the side bars of the supplementary frame at the upper and lower ends of the saw blades, in front of and behind the blades, said directing rods serving as a support for the gauges when setting up the blades. It has also been suggested in this procedure to cause the saw blades to bear with their fore edge against the front pair of directing rods, so that the saw blades could be adjusted at the same time with respect to their inclination in the direction of feed.

This arrangement involves a number of drawbacks, by reason of which the proposition in question has not been realized. Thus, the arrangement was not removable from the frame, but had to follow in the frame movement in the sawing operation, which evidently involved an unsuitable increase of the weight of the frame. By the fact that the arrangement was in this manner tied to the frame, so to say, the blades were also correspondingly tied in such manner that they could not or could only with great difficulty be removed from the frame each per se. For the purpose of directing the blades with this arrangement the blades furthermore had to be provided with specially worked portions on their front side, which involved another disadvantage. In its entirety the arrangement was unnecessarily complicated and unmanageable.

Through the present invention, the arrangement has been improved to such an extent that not only does it permit of being readily removed from the frame after the directing of the blades has been completed, but the blades may also be severally removed or inserted with ease, without being hampered by the directing means. This is a great advantage where individual blades have been damaged or require to be exchanged for any other reason.

The novel arrangement is principally distinguished by the feature that the directing rods are arranged on the one side of the frame only, preferably the rear side, in such manner that the blades may, each per se, be freely inserted into or removed from the frame on the opposite side.

The accompanying drawings illustrate an embodiment of the invention by way of example. Fig. 1 is a diagrammatic representation of a saw frame shown in a front view, some of the details, such as the feeding device, having been omitted for the sake of clearness. Fig. 2 shows the supplementary frame in a rear view with the inserting means attached thereto and an inserted set of blades. Fig. 3 is a plan view of the supplementary frame shown in section on line 3—3 in Fig. 2. Fig. 4 shows the supplementary frame in section on line 4—4 in Fig. 2.

In Fig. 1, 20 designates the bottom plate of the saw frame, 21 the frame, 22 the crank shaft journalled in the bottom plate, 23 belt pulleys arranged on said shaft, 24 a fly-wheel and 25 the connecting rod. The latter is pivoted to the supplementary frame by means of a pin 26. The supplementary frame comprises the upper cross-beam 27, the lower cross-beam 28, the side bars 1 connecting the cross-beams, the guide block 29, and the means for insertion and retention of the saw blades 9—13, among such means the schematically indicated rods 4. Thus, an upward and downward movement will be imparted to the supplementary frame by means of a crank movement, the supplementary frame being then guided in guides 30 provided in the frame 21.

The arrangement for the insertion of the saw blades comprises two spacing bars, one for the adjustment of the upper ends of the saw blades and one for the adjustment of the lower ends thereof. Both spacing bars may be of the same construction. Secured to the side bars 1 of the blade frame are gauge tensioner attachments 2 for each spacing bar, said attachments being provided with spaced straps 3 constituting rearwardly opening bifurcations adapted to receive the ends of a directing rod 4. This rod is retained by means of pins 5 threaded through openings 6 in the shanks of the straps 3. The straps 3 are provided with a plurality of openings 6, whereby the directing rods 4 of both spacing bars may be so adjusted that in the upper spacing bar the rod 4 will be situated more or less in front of the rod 4 in the lower spacing bar, so as to bring about the above-mentioned slope of the blades in the feeding direction. Each directing rod 4 carries a sufficient number of fingers 7 and 8, which are thrust onto the rod and may be displaced thereon as well as locked thereto in their adjusted positions.

The insertion of the saw blades is effected in the following manner:

The directing rods 4, with a sufficient number of fingers on each rod, are introduced into the straps 3 at the upper and lower gauge tensioner attachments 2, and are locked by means of the pins 5, so that the upper rod will be situated in front of the lower one by the amount required for the desired slope of the blades. In such saw frames where the inclination of the blades is effected by the whole blade frame being tilted forwardly, both directing rods 4 are inserted at the same distance from the side bars 1 of the supplementary frame.

Generally, there is one central blade in the middle of a set of blades. The two central fingers 8 adapted to extend on the opposite sides of said central blade may always be locked to their directing rod, in order to serve as a fixed starting point when the blades are inserted. The central saw blade 9 is introduced between the fingers 8 so far that the rear edge of the blade is caused to bear against the upper and lower directing rods 4. This blade will thus be properly directed with its plane by the fingers 8, not only in the vertical direction, but also in the sawing direction, and will have the correct inclination in said direction. The blade is stretched up in the ordinary way by means of a stretching buckle 10 to full tension, and then serves as a starting point in the insertion of the remaining blades. At the upper end of the saw blades, the gauges 11 are then inserted upon the fingers 8, and at the lower end of the blades the gauges are laid upon the lower cross strip 12 of the blade. The fingers on the lower directing rod 4 therefore only serve to properly guide the blades when the latter are inserted. After the gauges 11 have been laid in, the blades 13 will be inserted, the fingers 7 being then also inserted successively, according as the insertion of the blades one after the other proceeds. According as the fingers 7 are thus positioned, gauges are laid upon the fingers at the upper ends of the blades and upon the lower cross strip 12 of the blades at the lower ends of the latter. One thus proceeds until the whole set of blades has been inserted. At last, clamping members 15, Fig. 1, are inserted and the clamping plates 16 are tightened up by means of the tension screws 17. Then all of the blades are stretched up completely with the aid of their corresponding stretching buckles 10. By then alternately tightening up the tension screws 17 on both sides of the set of blades, the latter are caused to form a rigid unit. The directing rods 4 with the fingers 8 and 7 are then released by the pins 5 being pulled out, all gauges then remaining securely fixed between the blades. 18 indicates the position of a log to be sawn.

In this manner, the whole set of blades has been set up properly and securely, and no additional heavy parts need follow the blade frame in its movement.

For certain definite blade sets, where the distances always remain the same, that is to say for standard blade sets, it is preferred to have the fingers 7 and 8 fixed to the directing rods 4 so as to save time in setting up the blade sets.

What I claim is:—

1. Apparatus for effecting correct positioning of a series of blades in a saw frame, said frame comprising top and bottom members between which the blades are tensionable and side members joining the top and bottom members, said apparatus comprising cross rods secured to the side members of the frame on one side only of the latter whereby the blades are freely insertable and removable from the other side of the frame, the top and bottom portion of the blades upon insertion abutting the cross rods to determine the vertical position of the blades relative to the frame.

2. Apparatus for effecting correct positioning of a series of blades in a saw frame, said frame comprising top and bottom members between which the blades are tensionable and side members joining the top and bottom members, said apparatus comprising cross rods secured to the side members of the frame at the rear side only of the latter whereby the blades are freely insertable and removable from the front side thereof, the top and bottom portion of the blades upon insertion abutting the cross rods to determine the vertical position of the blades relative to the frame.

3. Apparatus for effecting correct positioning of a series of blades in a saw frame, said frame comprising top and bottom members between which the blades are tensionable and side members joining the top and bottom members, said apparatus comprising cross rods extending between the side members of the frame on one side only of the latter whereby the blades are freely insertable and removable from the other side of the frame, the top and bottom portions of the blades upon insertion abutting the cross rods to determine the vertical position of the blades relative to the frame, and means removably securing the cross rods to the side members whereby said rods are removable subsequent to the tensioning of the blades.

4. Apparatus for effecting correct positioning of a series of blades in a saw frame, said frame comprising top and bottom members between which the blades are tensionable and side members joining the top and bottom members, said apparatus comprising cross rods extending between the side members of the frame on one side only of the latter whereby the blades are freely insertable and removable from the other side of the frame, the top and bottom portions of the blades upon insertion abutting the cross rods to determine the vertical position of the blades relative to the frame, and means for supporting said rods in connection with said side members for adjustment toward the side members or away therefrom to control the slope of the blades.

5. Apparatus for effecting correct positioning of a series of blades in a saw frame, said frame comprising top and bottom members between which the blades are tensionable and side members joining the top and bottom members, said apparatus comprising cross rods extending between the side members of the frame on one side only of the latter whereby the blades are freely insertable and removable from the other side of the frame, the top and bottom portions of the blades upon insertion abutting the cross rods to determine the vertical position of the blades relative to the frame, and means for supporting said rods in connection with said side members for independent adjustment toward the side members or away therefrom to control the slope of the blades.

6. Apparatus for effecting correct positioning of a series of blades in a saw frame, said frame comprising top and bottom members between which the blades are tensionable and side members joining the top and bottom members, said apparatus comprising cross rods extending between the side members of the frame on one side only of the latter whereby the blades are freely insertable and removable from the other side of the frame, the top and bottom portions of the blades upon insertion abutting the cross rods to determine the vertical position of the blades relative to the frame, means removably securing the cross rods to the side members whereby said rods are removable subsequent to the tensioning of the blades, said securing means comprising pairs of straps projecting from the side members and between which the ends of the rods are engaged, and pins removably engaged in registering holes in the straps and rod ends.

7. Apparatus for effecting correct positioning of a series of blades in a saw frame, said frame comprising top and bottom members between which the blades are tensionable and side members joining the top and bottom members, said apparatus comprising cross rods extending between the side members of the frame on one side only of the latter whereby the blades are freely insertable and removable from the other side of the frame, the top and bottom portions of the blades upon insertion abutting the cross rods to determine the vertical position of the blades relative to the frame, means for supporting said rods in connection with said side members for adjustment toward the side members or away therefrom to control the slope of the blades, said supporting means comprising pairs of straps projecting from the side members and between which the ends of the rods are engaged, and pins removably engaged in registering holes in the straps and rod ends, the straps being provided with sets of holes spaced longitudinally thereof for the selective reception of said pins.

8. Apparatus for effecting correct positioning of a series of blades in a saw frame, said frame comprising top and bottom members between which the blades are tensionable and side members joining the top and bottom members, said apparatus comprising cross rods secured to the side members of the frame on one side only of the latter whereby the blades are freely insertable and removable from the other side of the frame, the top and bottom portion of the blades upon insertion abutting the cross rods to determine the vertical position of the blades relative to the frame, and fingers mounted on said rods between which the blades are insertable to secure their substantially correct spacing.

9. Apparatus for effecting correct positioning of a series of blades in a saw frame, said frame comprising top and bottom members between which the blades are tensionable and side members joining the top and bottom members, said apparatus comprising cross rods secured to the side members of the frame on one side only of the latter whereby the blades are freely insertable and removable from the other side of the frame, the top and bottom portion of the blades upon insertion abutting the cross rods to determine the vertical position of the blades relative to the frame, fingers mounted on said rods between which the blades are insertable to secure their substantially correct spacing, said fingers being slidable longitudinally of the rods, and releasable means for securing the fingers to the rods.

10. Apparatus for effecting correct positioning of a series of blades in a saw frame, said frame comprising top and bottom members between which the blades are tensionable and side members joining the top and bottom members, said apparatus comprising cross rods secured to the side members of the frame on one side only of the latter whereby the blades are freely insertable and removable from the other side of the frame, the top and bottom portion of the blades upon insertion abutting the cross rods to determine the vertical position of the blades relative to the frame, fingers mounted on said rods between which the blades are insertable to secure their substantially correct spacing, said fingers being swingable about the rods, and releasable means for securing the fingers to the rods.

11. Apparatus for effecting correct positioning of a series of blades in a saw frame, said frame comprising top and bottom members between which the blades are tensionable and side members joining the top and bottom members, said apparatus comprising cross rods secured to the side members of the frame on one side only of the latter whereby the blades are freely insertable and removable from the other side of the frame, the top and bottom portion of the blades upon insertion abutting the cross rods to determine the vertical position of the blades relative to the frame, fingers mounted on said rods between which the blades are insertable to secure their substantially correct spacing, said fingers being swingable about the rods and slidable relative thereto, and releasable means for securing the fingers to the rods.

12. Apparatus for effecting correct positioning of a series of blades in a saw frame, said frame comprising top and bottom members between which the blades are tensionable and side members joining the top and bottom members, said apparatus comprising cross rods secured to the side members of the frame on one side only of the latter whereby the blades are freely insertable and removable from the other side of the frame, the top and bottom portion of the blades upon insertion abutting the cross rods to determine the vertical position of the blades relative to the frame, and fingers mounted on said rods between which the blades are insertable to secure their substantially correct spacing, said fingers presenting top surfaces adapted to support gauge blocks.

KARL ERIK RUDOLF ÖSTERBERG.